(12) United States Patent
Chen et al.

(10) Patent No.: US 10,858,936 B2
(45) Date of Patent: Dec. 8, 2020

(54) DETERMINING GEOLOGIC FORMATION PERMEABILITY

(71) Applicant: Saudi Arabian Oil Company, Dhahran (SA)

(72) Inventors: Jin-Hong Chen, Katy, TX (US); Stacey M. Althaus, Houston, TX (US); Hui-Hai Liu, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 149 days.

(21) Appl. No.: 16/149,401

(22) Filed: Oct. 2, 2018

(65) Prior Publication Data

US 2020/0102824 A1   Apr. 2, 2020

(51) Int. Cl.
| | | |
|---|---|---|
| *G01V 3/32* | (2006.01) | |
| *G01V 3/38* | (2006.01) | |
| *E21B 49/08* | (2006.01) | |

(52) U.S. Cl.
CPC .............. *E21B 49/087* (2013.01); *G01V 3/32* (2013.01); *G01V 3/38* (2013.01)

(58) Field of Classification Search
CPC .......... E21B 49/087; G01V 3/32; G01V 3/38; G01N 24/081
USPC ....................................................... 324/303
See application file for complete search history.

(56) References Cited

U.S. PATENT DOCUMENTS

| | | |
|---|---|---|
| 5,023,551 A | 6/1991 | Kleinberg et al. |
| 5,387,865 A | 2/1995 | Jerosch-Herold et al. |
| 5,486,762 A | 1/1996 | Freedman et al. |
| 7,091,719 B2 | 8/2006 | Freedman |
| 9,222,902 B2 | 12/2015 | Gruber et al. |
| 2012/0273193 A1* | 11/2012 | Sen .................. G01N 24/081 166/250.01 |

(Continued)

OTHER PUBLICATIONS

Shafer, J.L., Chen, S. and Georgi, D.T., 2005. Protocols for calibrating NMR log-derived permeabilities. In International symposium of the society of core analysts, SCA2005-37. (Year: 2005).*

(Continued)

*Primary Examiner* — Christopher P McAndrew
(74) *Attorney, Agent, or Firm* — Fish & Richardson P.C.

(57) ABSTRACT

Techniques for determining geologic formation permeability include determining particular permeability values from an NMR log permeability data and particular permeability values of the core permeability measurements; determining a selected NMR permeability transform that includes inputs including the determined particular permeability values; minimizing a cost function to optimize the selected NMR permeability transform; calculating new permeability values for the wellbore between the terranean surface and a true vertical depth of the wellbore with the optimized NMR permeability transform; comparing the calculated new permeability values at particular depths between the terranean surface and the true vertical depth that match depths of the core permeability measurements; based on the comparison meeting a particular threshold, generating a user interface that renders one or more graphical representations of the optimized NMR permeability transform and the calculated new permeability values; and transmitting data that represents the one or more graphical representations.

21 Claims, 5 Drawing Sheets

(56) References Cited

U.S. PATENT DOCUMENTS

| | | | | |
|---|---|---|---|---|
| 2013/0282386 | A1* | 10/2013 | Vilermo | G10L 19/008 704/500 |
| 2015/0112488 | A1* | 4/2015 | Hoehn | E21B 44/00 700/275 |
| 2015/0300968 | A1* | 10/2015 | Bae | G01N 24/088 506/6 |
| 2016/0170067 | A1* | 6/2016 | Heaton | G01V 3/38 324/303 |
| 2016/0208602 | A1* | 7/2016 | Donderici | G01V 3/38 |
| 2016/0230549 | A1* | 8/2016 | Cao Minh | E21B 49/08 |
| 2017/0032078 | A1* | 2/2017 | Stelzer | G01N 33/6845 |

OTHER PUBLICATIONS

Alharbi, A., 2013. Experimental Evaluation of the Effect of Carbonate Heterogeneity on Oil Recovery to Water and Gas Injections. (Year: 2013).*

Timur, "Effective Porosity and Permeability of Sandstones Investigated Through Nuclear Magnetic Resonance Principles," Society of Petrophysicists and Well-Log Analysts, presented at the SPWLA 9th Annual Logging Symposium, Jun. 23-26, 1968, 18 pages.

Kenyon, "Petrophysical Principles of Applications of NMR Logging," Society of Petrophyicists and Well-Log Analysts, vol. 38, Issue 2, Mar. 1997, 23 pages.

Chen et al., "Optimization of NMR Permeability Transform and Application to Middle East Tight Sands," Society of Petrophysicists and Well-Log Analysts, SPWLA 58th Annual Logging Symposium, Jun. 17-21, 2017, 11 pages.

Jerath et al., "Improved assessment of in-situ fluid saturation with multi-dimensional NMR measurements and conventional well logs," SPWLA 53rd Annual Logging Symposium, Jun. 16-20, 2012, 16 pages.

Althaus et al., "Permeability Estimation of a Middle-East Tight Gas Sand with NMR Logs," Proceedings of the 5th Unconventional Resources Technology Conference, XP055651850, Jul. 24, 2017, 7 pages.

Amabeoku et al., "Calibration of Permeability Derived from NMR Lobs in Carbonate Reservoirs," SPE Middle East Oil Show, XP055652014, Mar. 17, 2001, 11 pages.

International Search Report and Written Opinion issued in International Application No. PCT/US2019/053198 dated Jan. 2, 2020, 17 pages.

Shafer et al., "Protocols for Calibrating NMR Log-Derived Permeabilities," International Symposium of the Society of Core Analysts, XP055652498, Aug. 21, 2005, 15 pages.

* cited by examiner

DETERMINING GEOLOGIC FORMATION PERMEABILITY

TECHNICAL FIELD

The present disclosure relates to systems and methods for determining geologic formation and, more particularly, determining geologic formation with an optimized nuclear magnetic resonance (NMR) permeability transform.

BACKGROUND

NMR logging techniques are sometimes used in estimating formation porosity and associated characteristics. NMR logging measures the induced magnet moment of hydrogen nuclei contained within the fluid-filled pore space of the formation. NMR logs provide information about the quantities of fluids present, the properties of these fluids, and the sizes of the pores containing these fluids.

SUMMARY

In a general implementation, a structured data processing system for determining geologic formation permeability includes one or more hardware processors; and a memory in communication with the one or more hardware processors. The memory stores a data structure and an execution environment. The data structure stores data that includes nuclear magnetic resonance (NMR) log permeability data from a wellbore that extends from a terranean surface through one or more geologic formations to a subterranean zone and core permeability measurements taken from the one or more geologic formations. The execution environment includes an NMR permeability optimization solver configured to perform operations that includes determining particular permeability values from the NMR log permeability data and particular permeability values of the core permeability measurements based on matched depths of the permeability values from the NMR log permeability data and the permeability values of the core permeability measurements. The operations also include determining a selected NMR permeability transform that includes inputs including the determined particular permeability values. The operations also include minimizing a cost function to optimize the selected NMR permeability transform; calculating new permeability values for the wellbore between the terranean surface and a true vertical depth of the wellbore with the optimized NMR permeability transform. The operations also include comparing the calculated new permeability values at particular depths between the terranean surface and the true vertical depth that match depths of the core permeability measurements. The operations also include, based on the comparison meeting a particular threshold, generating a user interface that renders one or more graphical representations of the optimized NMR permeability transform and the calculated new permeability values. The system also includes a transmission module that transmits, over one or more communication protocols and to a computing device, data that represents the one or more graphical representations.

In an aspect combinable with the general implementation, the NMR permeability optimization solver configured to perform operations further including determining that the comparison does not meet the particular threshold.

In another aspect combinable with any one of the previous aspects, the selected NMR permeability transform includes a first selected NMR permeability transform.

In another aspect combinable with any one of the previous aspects, the NMR permeability optimization solver is configured to perform operations further including, based on the determination determining a second selected NMR permeability transform that includes inputs including the determined particular permeability values. The operations further include minimizing the cost function to optimize the second selected NMR permeability transform; calculating new permeability values for the wellbore between the terranean surface and the true vertical depth of the wellbore with the optimized NMR permeability transform. The operations further include comparing the calculated new permeability values at particular depths between the terranean surface and the true vertical depth that match depths of the core permeability measurements. The operations further include based on the comparison meeting the particular threshold, generating a user interface that renders one or more graphical representations of the optimized NMR permeability transform and the calculated new permeability values.

In another aspect combinable with any one of the previous aspects, the NMR permeability optimization solver configured to perform operations further including, based on the determination inputting the determined new permeability values into the selected NMR permeability transform. The operations further include minimizing a cost function to optimize the selected NMR permeability transform. The operations further include calculating new permeability values for the wellbore between the terranean surface and the true vertical depth of the wellbore with the optimized NMR permeability transform. The operations further include comparing the calculated new permeability values at particular depths between the terranean surface and the true vertical depth that match depths of the core permeability measurements. The operations further include based on the comparison meeting a particular threshold, generating a user interface that renders one or more graphical representations of the optimized NMR permeability transform and the calculated new permeability values.

In another aspect combinable with any one of the previous aspects, the cost function is $$\delta = \sum_j \frac{1}{(k_j^{core})^p} |k_j^{core} - k_j^{NMR}|^q,$$

where $\delta$ is the cost function error, j is a particular wellbore depth, p and q are indices, $k_j^{core}$ is a core permeability measurement at j depth, and $k_j^{NMR}$ is an NMR log permeability value at j depth.

In another aspect combinable with any one of the previous aspects, the subterranean zone includes an unconventional hydrocarbon reservoir.

In another aspect combinable with any one of the previous aspects, the particular threshold includes a logarithmic comparison of the calculated new permeability values at particular depths between the terranean surface and the true vertical depth that match depths of the core permeability measurements.

In another aspect combinable with any one of the previous aspects, the logarithmic comparison includes an N-fold logarithmic comparison.

In another aspect combinable with any one of the previous aspects, N includes an integer between 2 and 10.

In another aspect combinable with any one of the previous aspects, the selected NMR permeability transform includes inputs including porosity and relaxation time.

In another general implementation, a computer-implemented method for determining geologic formation permeability performed on a hardware processing device that includes a memory and one or more hardware processors includes identifying, with the one or more hardware processors, a data structure stored in the memory. The data structure stores data that includes nuclear magnetic resonance (NMR) log permeability data from a wellbore that extends from a terranean surface through one or more geologic formations to a subterranean zone and core permeability measurements taken from the one or more geologic formation. The method further includes determining, with the one or more hardware processors, particular permeability values from the NMR log permeability data and particular permeability values of the core permeability measurements based on matched depths of the permeability values from the NMR log permeability data and the permeability values of the core permeability measurements. The method further includes determining, with the one or more hardware processors, a selected NMR permeability transform that includes inputs including the determined particular permeability values. The method further includes minimizing, with the one or more hardware processors, a cost function to optimize the selected NMR permeability transform. The method further includes calculating, with the one or more hardware processors, new permeability values for the wellbore between the terranean surface and a true vertical depth of the wellbore with the optimized NMR permeability transform. The method further includes comparing, with the one or more hardware processors, the calculated new permeability values at particular depths between the terranean surface and the true vertical depth that match depths of the core permeability measurements. The method further includes based on the comparison meeting a particular threshold, generating, with the one or more hardware processors, a user interface that renders one or more graphical representations of the optimized NMR permeability transform and the calculated new permeability values. The method further includes transmitting, with the one or more hardware processors, over one or more communication protocols and to a remote computing device, data that represents the one or more graphical representations.

An aspect combinable with the general implementation further includes determining that the comparison does not meet the particular threshold.

In another aspect combinable with any one of the previous aspects, the selected NMR permeability transform includes a first selected NMR permeability transform.

Another aspect combinable with any one of the previous aspects further includes, based on the determination, determining, with the one or more hardware processors, a second selected NMR permeability transform that includes inputs including the determined particular permeability values.

Another aspect combinable with any one of the previous aspects further includes minimizing, with the one or more hardware processors, the cost function to optimize the second selected NMR permeability transform.

Another aspect combinable with any one of the previous aspects further includes calculating, with the one or more hardware processors, new permeability values for the wellbore between the terranean surface and the true vertical depth of the wellbore with the optimized NMR permeability transform.

Another aspect combinable with any one of the previous aspects further includes comparing, with the one or more hardware processors, the calculated new permeability values at particular depths between the terranean surface and the true vertical depth that match depths of the core permeability measurements.

Another aspect combinable with any one of the previous aspects further includes based on the comparison meeting the particular threshold, generating, with the one or more hardware processors, a user interface that renders one or more graphical representations of the optimized NMR permeability transform and the calculated new permeability values.

Another aspect combinable with any one of the previous aspects further includes, based on the determination, inputting, with the one or more hardware processors, the determined new permeability values into the selected NMR permeability transform.

Another aspect combinable with any one of the previous aspects further includes minimizing, with the one or more hardware processors, the cost function to optimize the selected NMR permeability transform.

Another aspect combinable with any one of the previous aspects further includes calculating, with the one or more hardware processors, new permeability values for the wellbore between the terranean surface and the true vertical depth of the wellbore with the optimized NMR permeability transform.

Another aspect combinable with any one of the previous aspects further includes comparing, with the one or more hardware processors, the calculated new permeability values at particular depths between the terranean surface and the true vertical depth that match depths of the core permeability measurements.

Another aspect combinable with any one of the previous aspects further includes based on the comparison meeting a particular threshold, generating, with the one or more hardware processors, a user interface that renders one or more graphical representations of the optimized NMR permeability transform and the calculated new permeability values.

In another aspect combinable with any one of the previous aspects, the cost function is:

$$\delta = \sum_j \frac{1}{(k_j^{core})^p} |k_j^{core} - k_j^{NMR}|^q,$$

where $\delta$ is the cost function error, j is a particular wellbore depth, p and q are indices, $k_j^{core}$ is a core permeability measurement at j depth, and $k_j^{NMR}$ is an NMR log permeability value at j depth.

In another aspect combinable with any one of the previous aspects, the subterranean zone includes an unconventional hydrocarbon reservoir.

In another aspect combinable with any one of the previous aspects, the particular threshold includes a logarithmic comparison of the calculated new permeability values at particular depths between the terranean surface and the true vertical depth that match depths of the core permeability measurements.

In another aspect combinable with any one of the previous aspects, the logarithmic comparison includes an N-fold logarithmic comparison.

In another aspect combinable with any one of the previous aspects, N includes an integer between 2 and 10.

In another aspect combinable with any one of the previous aspects, the selected NMR permeability transform includes inputs including porosity and relaxation time.

Implementations according to the present disclosure may include one or more of the following features. For example, implementations according to the present disclosure may link select core permeability values and NMR log data by acquisition location to optimize an NMR permeability transform for one or several wells. The optimized NMR transform can be used to calculate the permeability for the whole reservoir. As another example, an optimized NMR transform according to the present disclosure may determine reservoir permeability values for tight or unconventional reservoirs.

The details of one or more implementations of the subject matter described in this disclosure are set forth in the accompanying drawings and the description. Other features, aspects, and advantages of the subject matter will become apparent from the description, the drawings, and the claims.

DETAILED DESCRIPTION

The present disclosure describes example implementations systems and processes for obtaining an optimized nuclear magnetic resonance (NMR) permeability transform according to NMR logs and laboratory measured core permeability values. In some aspects, the described processes are model-free to determine an optimal NMR permeability transform based on the measured NMR logs and core permeability data. Thus, the described processes to optimize an NMR permeability transform are independent of any specific fluids in the geologic formations; thus the described processes may obtain an optimal NMR permeability transform for any reservoirs when core data are available.

Rock permeability is generally determined by averaged (for example, threshold) pore size and pore-size distribution, and the NMR signals are related to those parameters and fluid distributions in the geologic formation reservoirs. There is a correlation between the NMR logs and permeability for a given reservoir because: (1) for heterogeneous natural porous media there exists similarities between pore-size distributions, scaled by local averaged pore size, at different locations; and (2) during acquisition of the NMR logs, the reservoir fluids are generally at equilibrium because the fluid flow induced by the production has not yet occurred. Thus, a correlation exists between fluid distribution and pore size distributions. For a given reservoir, NMR logs are closely related to both averaged (for example, threshold) pore size and pore-size distribution, and thus are a function of rock permeability.

In some aspects, the described processes may use a portion of NMR log data from one or multiple wells where the core permeability data are available to optimize an NMR permeability transform. The optimized NMR permeability transform is then used to calculate permeability from log data for the entire reservoir (for example, along an entire depth of a wellbore formed into and through the reservoir).

As is known, permeability measures the ability of a rock to conduct flow and is one of the most fundamental rock properties governing hydrocarbon production. Conventional techniques for determining permeability values provide either a "point" permeability, which is specific to the location where the sample was acquired (for example, core measurement) or where the testing was conducted (for example, formation testing), or an average permeability, which takes into account a large reservoir volume (for example, well testing and history matching).

Conventionally, permeability can only be estimated from NMR logging using a permeability transform that is an empirical formula specific to the particular reservoir. Although generic forms of NMR permeability transforms have been established, they require calibration based on the specific reservoir to determine certain parameters using core permeability from the reservoir of interest. Furthermore, to apply the conventional calibrated NMR transforms to the reservoir, a complex fluid substitution procedure may also be required because the calibrated NMR permeability transform is normally obtained from a single fluid, such as brine, while the NMR logs of the interested zone can include a mixture of fluids, for example hydrocarbon and water. In addition, such conventional calibrated NMR transforms do not work well for tight, carbonate, and unconventional reservoirs.

Figure 1:
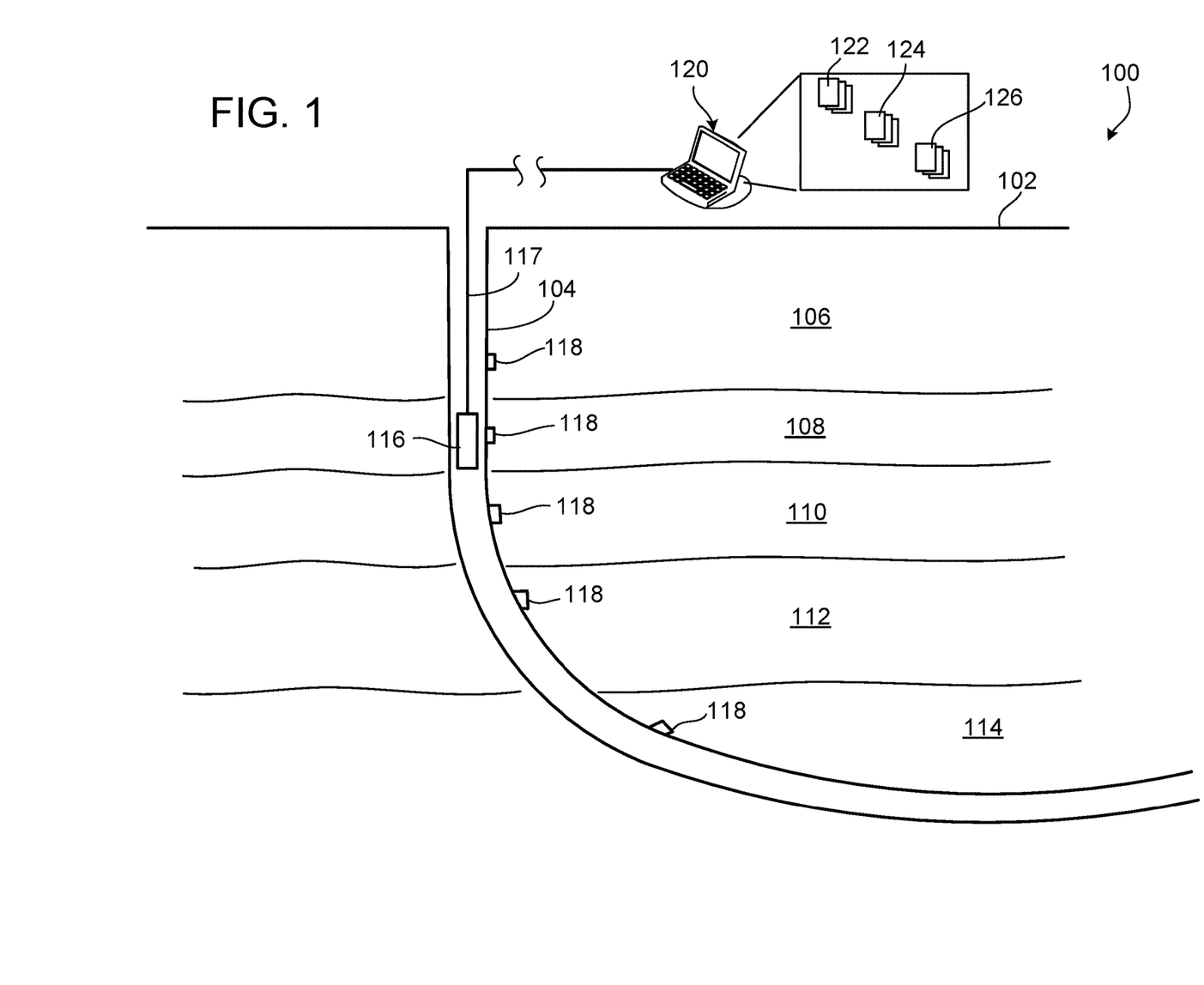
FIG. 1 shows a schematic illustration of an example well system which includes an NMR logging tool to generate an NMR log of one or more geologic formations.

FIG. 1 shows a schematic illustration of an example well system 100, which includes an NMR logging tool to generate an NMR log of one or more geologic formations that can be used in the described NMR transform optimization systems and processes. For example, as shown, the well system 100 includes a wellbore 104 that is formed (for example, drilled) from a terranean surface 102 (whether on land or under a body of water) through multiple geologic formations 106 through 114 (also referred to as reservoirs or subterranean zones). In some aspects, each of the formations 106 through 114 may be formed of or comprise different rock types. In some aspects, one or more of the formations 106 through 114 may be formed or comprise the same or similar rock.

Although illustrated as a directional wellbore 104 (for example, a wellbore that includes a vertical portion, a deviated portion, and a horizontal portion), wellbore 104 may be a vertical wellbore only, or may include lateral wellbores. Thus, reference to wellbore 104 includes any borehole that may be formed from the terranean surface 102 into one or more geologic formations.

Well system 100 also includes an NMR logging tool 116 that may be run into the wellbore 104 on a downhole conveyance 117 (for example, wireline or a tubing conveyance). The NMR logging tool 116 can record multiple parameters indicative of the geologic formations 106 through 114 during a logging operation through an entire length or depth of the wellbore 104. For example, NMR logging tool 116 may operate to measure an induced magnet moment of hydrogen nuclei contained within the fluid-filled pore space of the geologic formations 106 through 114. The NMR logging tool 116 may respond to the volume, composition, viscosity, and distribution of fluids, for example, oil, gas, and water, in the geologic formations 106 through 114. The NMR logging tool 116 may record information about the quantities of such fluids present, the properties of these fluids, and the sizes of the pores in the formations 106-114 that contain these fluids. Thus, the NMR logging tool 116 may record or estimate volume (porosity) and distribution (permeability) of the rock pore space, rock composition, type and quantity of fluid hydrocarbons, and hydrocarbon producibility. The NMR logging tool 116 also records $T_1$ relaxation (longitudinal relaxation time in seconds) and $T_2$ relaxation (transverse relaxation time in seconds).

The parameters and properties recorded by the NMR logging tool 116 are stored or recorded by a structured data processing system 120 that is communicably coupled to (or configured to communicably couple to) the NMR logging tool 116. For example, the structured data processing system 120 stores log data values 122 (for example, porosity, relaxation times, fluid measurements) taken by the NMR logging tool 116 during a logging operation. The structured data processing system 120 may also store permeability values taken from core samples 118 throughout the wellbore 104. The log data values 122 from the NMR logging tool 116, as well as the core permeability values 124 taken (for example, in a laboratory or in the field) from the core samples 118 each have an associated wellbore depth. The structured data processing system 120 also stores one or more NMR permeability transforms 126, from which to select during an NMR permeability transform optimization process (as described in FIG. 3).

Figure 2:
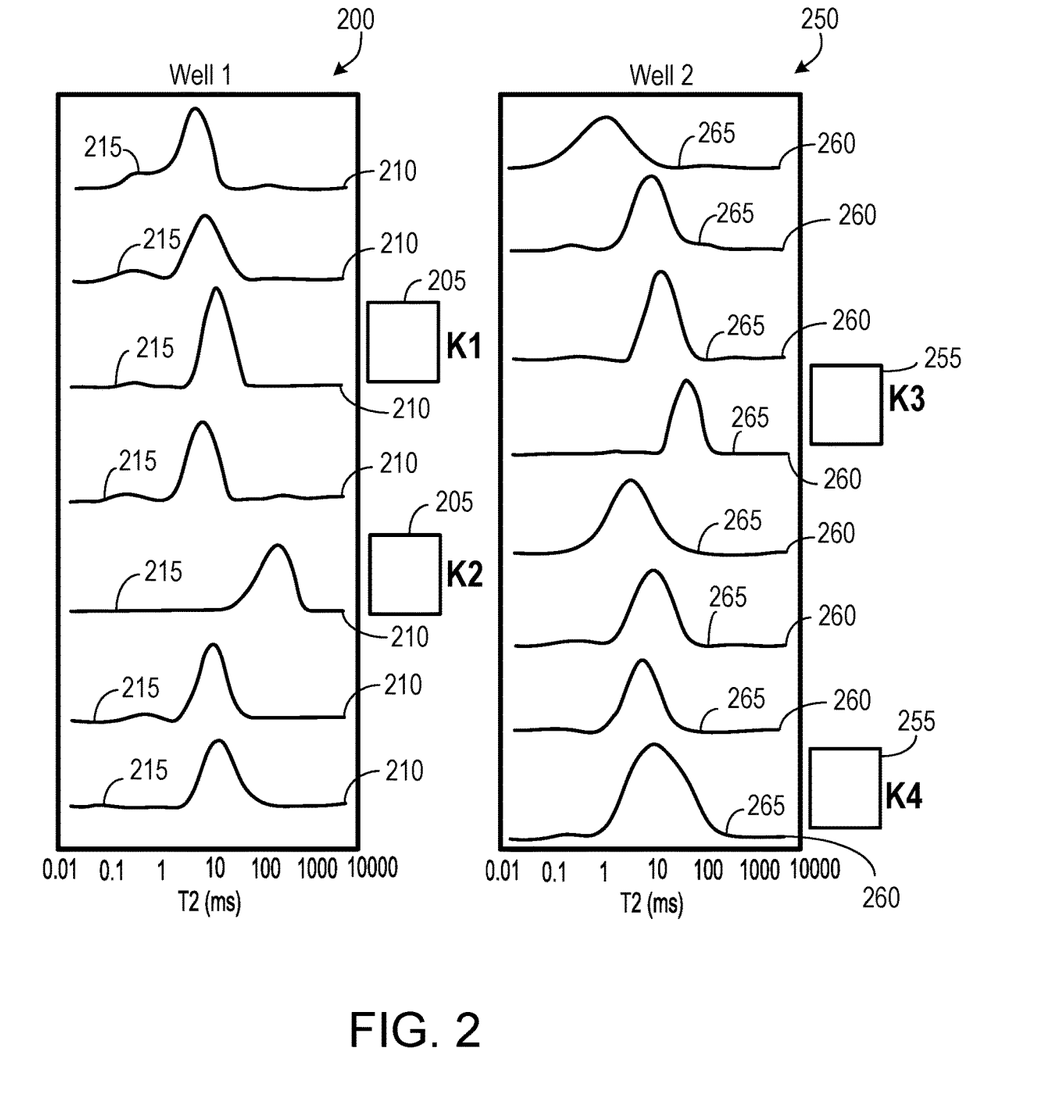
FIG. 2 illustrates a graphical representation of NMR data and core data at different depths from two wellbores.

FIG. 2 illustrates a graphical representation of NMR data and core data at different depths from two wellbores. For example, FIG. 2 shows graphs 200 and 250, each of which is associated with a particular wellbore (such as wellbore 104 and another wellbore). Each of graphs 200 and 250 illustrate NMR data values 215 and 265 (for well 1 and well 2, respectively), at different depths 210 and 260 (for well 1 and well 2, respectively). Graphs 200 and 250 also show core 205 and 255 permeability values K1, K2, K3, and K4 (for well 1 and well 2, respectively) at particular depths 210 and 260. Thus, for example, two core samples 205 were taken at two depths 210 from well 1, with permeability values K1 and K2 of those two core samples determined in a laboratory or in the field. Also, two core samples 255 were taken at two depths 260 from well 2, with permeability values K3 and K4 of those two core samples determined in a laboratory or in the field. As shown, graphs 200 and 250 provide T2 relaxation measurements as the NMR data 215/265 from which NMR log permeability values may be determined. As noted with reference to FIG. 1, NMR values 215/265 may be stored in the structured data processing system 120 as values 122, while core sample permeability values 205/255 may be stored in the structured data processing system 120 as values 124.

Figure 3:
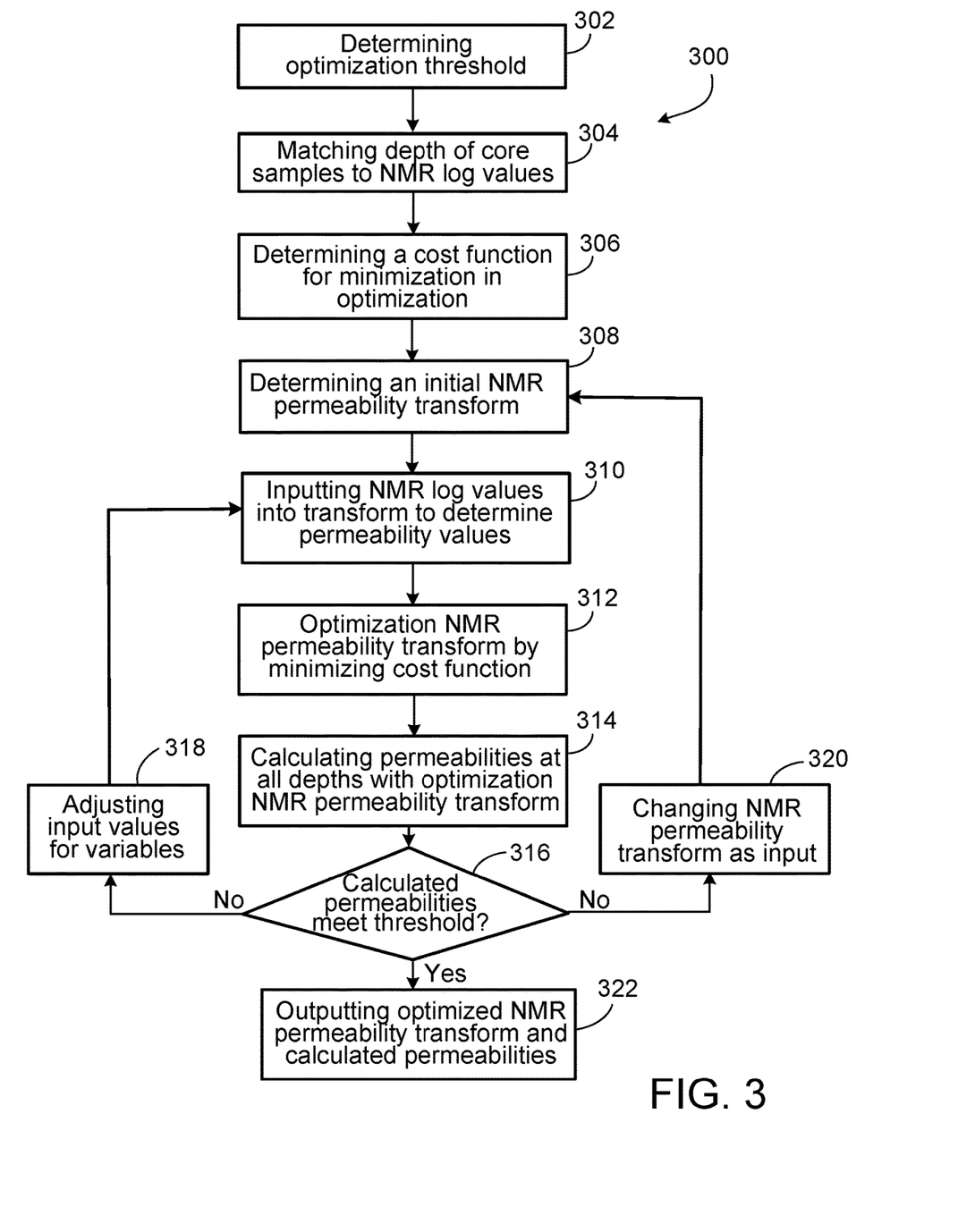
FIG. 3 illustrates a flowchart that describes an example process for determining an optimized NMR permeability transform and calculated permeability values along a wellbore.

FIG. 3 illustrates a flowchart that describes an example process 300 for determining an optimized NMR permeability transform and calculated permeability values along a wellbore. In some aspects, process 300 may be implemented by or with the structured data processing system 120 shown in FIG. 1. Process 300 may begin at step 302, which includes determining an optimization process threshold. For example, in some aspects a determination of whether or not an NMR permeability transform is "optimized" through process 300 may depend on a comparison of permeability values calculated according to the optimized NMR transform and the core sample permeability values. In other words, a comparison between calculated values and actual values of the reservoir as tested by the core samples. In some aspects, a threshold is defined that determines whether the comparison is accurate enough such that the NMR transform is optimized, for example, accurate enough. In some aspects, the threshold is set by a logarithmic plot of the calculated NMR transform permeability values at depths of the wellbore from which the core samples were taken vs. core sample permeability values at those depths.

Figure 4:
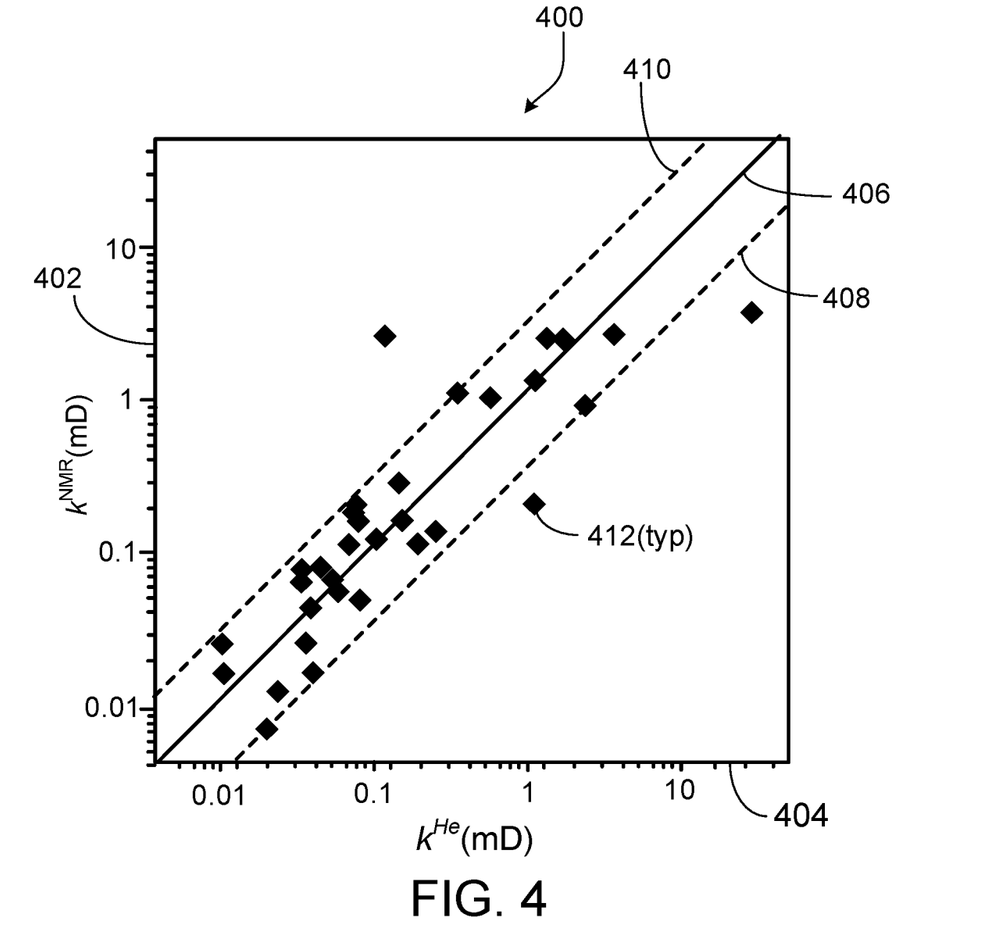
FIG. 4. illustrates a graph that describes lab results of a comparison of permeability values calculated according to the optimized NMR permeability transform process of FIG. 3 and core permeability values.

Turning briefly to FIG. 4, a graph 400 is shown of a logarithmic plot of permeability ($K^{NMR}$ in millidarcies) calculated from an NMR transform optimized by process 300 versus the permeability measured on the same core ($K^{He}$ in millidarcies). Graph 400 includes y-axis 402 that plots $K^{NMR}$ and x-axis 404 that plots $K^{He}$. This logarithmic plot shows N-fold lines 408 and 410, with a match line 406. Thus, points 412 that fall on or close to the match line 406 show that the calculated $K^{NMR}$ matched or almost matched the measured $K^{He}$ at a particular wellbore depth. If a majority of points 412 fall within the N-fold lines 408 and 410 to show that the calculated $K^{NMR}$ was close to, depending on "N," the measured $K^{He}$ at particular wellbore depths, the threshold may be met (a defined by the selection of N). N is typically an integer between 2 and 10—the closer N is to 2, the more closely the majority of calculated $K^{NRM}$ must be to the measured $K^{He}$ (at particular depths) to be considered to have met the threshold. In the example shown in graph 400, N is set at 3, meaning that the N-fold line 410 is a 3-fold line and N-fold line 408 is a ⅓-fold line.

Process 300 may continue at step 304, which includes matching depth of core samples to NMR log values. For example, the NMR log permeability data (for example, values 122) and collected core permeability data (for example, values 124) are collected and matched according to matching depths. In some aspects, additional NMR log data at the position the cores are extracted may be collected. For example, the NMR log data can be further processed to obtain different properties such as $T_2$ distribution, average $T_2$, or different fluid quantities. In some aspects, such additional properties may be used in step 310 for the NMR permeability transform optimization. For example, additional parameters of the NMR log data (for example, at the matching core depths) can further be used as inputs in the initial permeability transform equation. As one example, the average T2 may be one of the variables in the permeability transform. As another example, NMR log data at other depths (for example, at depths in which no cores were obtained) may be used them to calculate the continuous NMR permeability at these depths using the optimized NMR permeability transform.

Process 300 may continue at step 306, which includes determining a cost function for minimization in the optimization step. For example, a cost function with error S can be calculated as:

$$\delta = \sum_j \frac{1}{(k_j^{core})^p} |k_j^{core} - k_j^{NMR}|^q,$$

where δ is the cost function error, j is a particular wellbore depth, p and q are indices, $k_j^{core}$ is a core permeability measurement at j depth, and $k_j^{NMR}$ is an NMR log permeability value at j depth. The introduction of a weighting term (($k_j^{core})^p$) is to balance the contribution of small permeability values (for example, permeability values that are orders of magnitude less than other permeability values) to δ; otherwise δ might be dominated by several or even one large permeability value. For instance, a small permeability may be in the nanodarcy to microdarcy range. Thus, the range of permeabilities that are being measured can be different by orders of magnitude. The weighting function (or regulation function) may ensure that the larger permeabilities do not dominate the curve fitting algorithm, as would happen when the large permeabilities are three or more orders of magnitude larger than the small permeabilities.

There are other example cost functions that may be used in step 306. For instance, another cost function is:

$$\delta(x_i) = \sum_j \frac{1}{(k_j^{core})^p} |k_j^{core} - k_j^{NMR}(x_i)|^2 + \lambda \|x_i\|_2^2,$$

where $x_i$ are variables used in the transform function, such as porosity and NMR relaxation time (for example, $T_1$ or $T_2$), and $\lambda$ is a penalty control parameter.

Process 300 may continue at step 308, which includes determining an initial NMR permeability transform. For example, there may be several conventional NMR transforms that may be used as an initial selection to be optimized by process 300. Example NMR transforms are the Schlumberger-Doll-Research (SDR) method and Timur-Coates method. Although such NMR transforms are not suitable— without optimization—for tight or unconventional reservoirs, they can serve as an initial NMR transform selection. Generally, the initial NMR transform can be any form of a function of the formation porosity and NMR relaxation time. For example, the power function of the porosity and NMR relaxation time can be an initial NMR transform selected in step 308. As other examples, existing transforms that are used for conventional reservoirs can be chosen, such as the SDR method and Timur-Coates method. In some aspects, criteria for choosing the initial NMR transform may be based upon what is known about the core samples or the studied reservoir (for example, what is known about geologic formations 106-114).

Process 300 may continue at step 310, which includes inputting NMR log values into the determined, initial NMR permeability transform. For example, the porosity and relaxation times values from the NMR log may be input into the selected NMR transform to arrive at calculated NMR transform permeability values.

Process 300 may continue at step 312, which includes optimizing the NMR permeability transform by minimizing the cost function. For example, the calculated permeability values, $K^{NMR}$, of step 310 are input into the selected cost function, along with the core sample permeability values, $K^{He}$, to minimize the error function 6 as a nonlinear multivariable problem. Many methods can be used for optimization. For example, a method based on the Nelder-Mead algorithm may be used in minimizing the cost function. The optimized NMR permeability transform may take a different form than the initial NMR permeability transform. For example, an initial NMR permeability transform may be:

$$k^{NMR} = c'\phi^a T_{2gm}^b$$

in which $\phi$ is porosity and $T_{2gm}$ is the geometric mean of the $T_2$ relaxation time from the NMR log data (data 122). In this example equation, a, b, and c' are constants that may be determined through optimization via an iterative process and the cost function. After optimization however, the NMR permeability transform may be:

$$K^{NMR} = A * T_{2gm},$$

where A is a constant and $K^{NMR}$ now only depends on the geometric mean of the $T_2$ relaxation time. The optimization, therefore, changes (in other words, determines the constants in the equation for $k^{NMR}$. For instance, the optimization determines the values of constants a, b, and c. Here, in the equation for $K^{NMR}$, it has been determined that a=0, b=1, and c'=A.

Process 300 may continue at step 314, which includes calculating permeability values at all depths with the optimized NMR permeability transform. For example, now that the optimized NMR permeability transform has been determined, permeability values for the entire wellbore (for example, where $T_2$ relaxation times were measured) may be calculated.

Process 300 may continue at step 316, which includes a determination whether the calculated permeability values meet the optimization process threshold. For example, as described in step 302, a threshold N-value is determined and the calculated permeability values (from step 314) is compared to the core sample permeability values. If a majority of the compared values are between the N-fold lines, then the threshold is met and process 300 moves to step 322.

If the optimization process threshold is not met in step 316, process 300 may continue at step 318, which includes adjusting the input values for variables. For example, one option is to change the input variables in the transform and then allow the iteration of the transform to continue, for example, change the values of a, b, or c' (or a combination thereof) and then reevaluate the transform.

Alternatively, if the optimization process threshold is not met in step 316, process 300 may continue at step 320, which includes changing the initially selected NMR permeability transform as input. For example, rather than adjusting the input values for variables, a different initial NMR permeability transform may be selected. Process 300 may therefore continue back at step 308 to select the new NMR transform.

Process 300 may continue from step 316 at step 322, which includes outputting optimized NMR permeability transform and calculated permeability values. For example, the permeability values for the wellbore (for example, along a total depth or length of the wellbore) calculated by the optimized NMR permeability transform may be prepared for a graphical representation on the structured data processing system 120.

Figure 5:
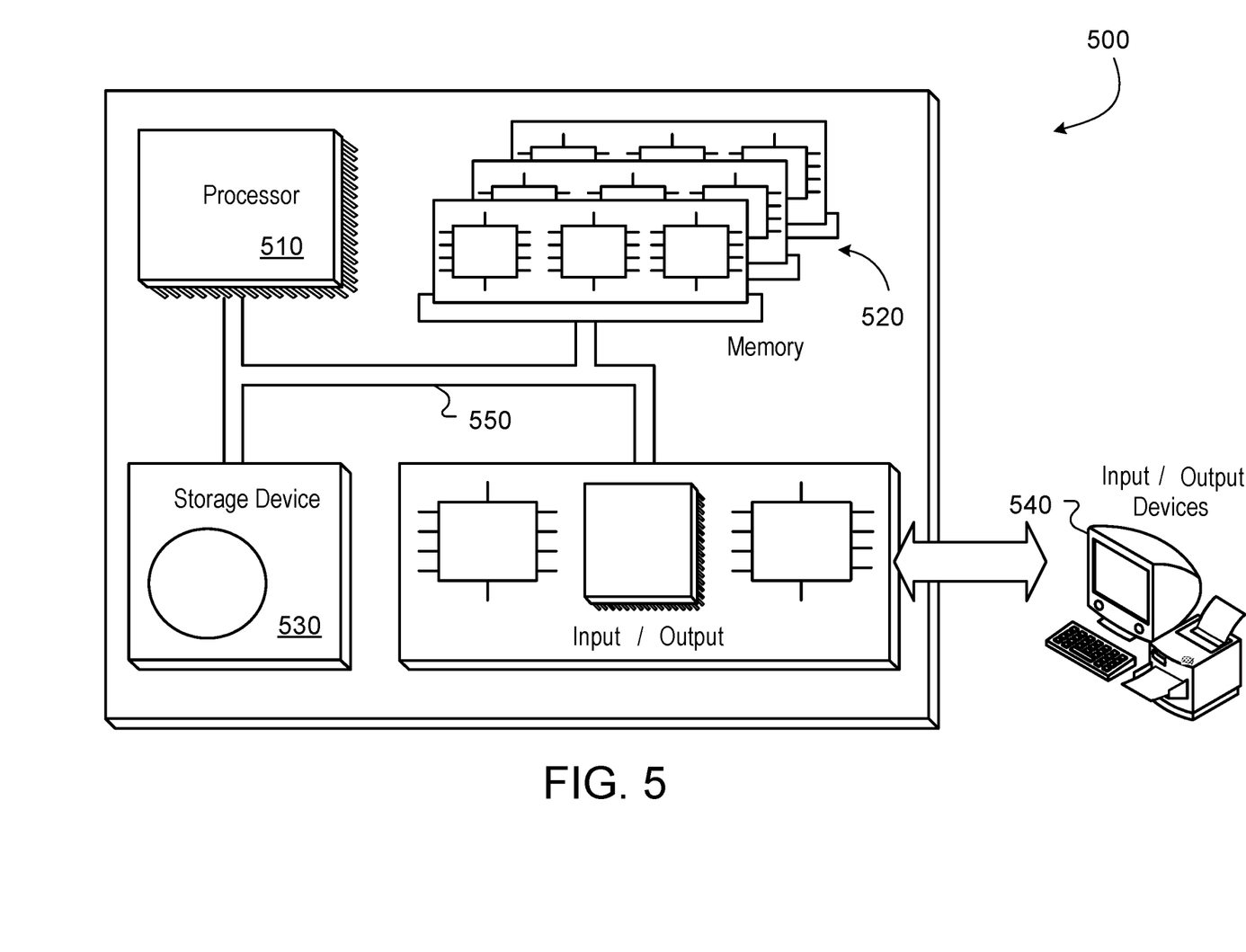
FIG. 5 is a schematic illustration of a controller or control system for a structured data processing for determining an optimized NMR permeability transform.

FIG. 5 is a schematic illustration of an example controller 500 (or control system) for a structured data processing system, such as system 120. The controller 500 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540. Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the controller 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, a tape device, flash memory, a solid state device (SSD), or a combination thereof.

The input/output device 540 provides input/output operations for the controller 500. In one implementation, the input/output device 540 includes a keyboard or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as erasable programmable read-only memory (EPROM), electrically erasable programmable read-only memory (EEPROM), solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described may include more steps or fewer steps than those described. Further, the steps in such example operations, methods, or processes may be performed in different successions than that described or illustrated in the figures. Accordingly, other implementations are within the scope of the following claims.

What is claimed is:

1. A structured data processing system for determining geologic formation permeability, the system comprising:
   one or more hardware processors; and
   a memory in communication with the one or more hardware processors, the memory storing a data structure and an execution environment, the data structure storing data that comprises nuclear magnetic resonance (NMR) log permeability data from a wellbore that extends from a terranean surface through one or more geologic formations to a subterranean zone and core permeability measurements taken from the one or more geologic formations, the execution environment comprising:
      an NMR permeability optimization solver configured to perform operations comprising:
         determining particular permeability values from the NMR log permeability data and particular permeability values of the core permeability measurements based on matched depths of the permeability values from the NMR log permeability data and the permeability values of the core permeability measurements;
         determining a selected NMR permeability transform that comprises inputs including the determined particular permeability values;
         minimizing a cost function to optimize the selected NMR permeability transform, where the cost function relates a particular wellbore depth, a core permeability measurement at the particular wellbore depth, and one or more of the particular permeability values from the NMR log permeability data;
         calculating new permeability values for the wellbore between the terranean surface and a true vertical depth of the wellbore with the optimized NMR permeability transform;
         comparing the calculated new permeability values at particular depths between the terranean surface and the true vertical depth that match depths of the core permeability measurements; and
         based on the comparison meeting a particular threshold, generating a user interface that renders one or more graphical representations of the optimized NMR permeability transform and the calculated new permeability values; and
      a transmission module that transmits, over one or more communication protocols and to a computing device, data that represents the one or more graphical representations.

2. The structured data processing system of claim 1, wherein the NMR permeability optimization solver is configured to perform operations further comprising determining that the comparison does not meet the particular threshold.

3. The structured data processing system of claim 2, wherein the selected NMR permeability transform comprises a first selected NMR permeability transform, and the NMR permeability optimization solver is configured to perform operations further comprising, based on the determination:
   determining a second selected NMR permeability transform that comprises inputs including the determined particular permeability values;
   minimizing the cost function to optimize the second selected NMR permeability transform;
   calculating new permeability values for the wellbore between the terranean surface and the true vertical depth of the wellbore with the optimized NMR permeability transform;
   comparing the calculated new permeability values at particular depths between the terranean surface and the true vertical depth that match depths of the core permeability measurements; and
   based on the comparison meeting the particular threshold, generating a user interface that renders one or more graphical representations of the optimized NMR permeability transform and the calculated new permeability values.

4. The structured data processing system of claim 2, wherein the NMR permeability optimization solver is configured to perform operations further comprising, based on the determination:
   inputting the determined new permeability values into the selected NMR permeability transform;
   minimizing the cost function to optimize the selected NMR permeability transform;
   calculating new permeability values for the wellbore between the terranean surface and the true vertical depth of the wellbore with the optimized NMR permeability transform;
   comparing the calculated new permeability values at particular depths between the terranean surface and the true vertical depth that match depths of the core permeability measurements; and
   based on the comparison meeting a particular threshold, generating a user interface that renders one or more graphical representations of the optimized NMR permeability transform and the calculated new permeability values.

5. The structured data processing system of claim 1, wherein the cost function comprises:

$$\delta = \sum_j \frac{1}{(k_j^{core})^p} |k_j^{core} - k_j^{NMR}|^q,$$

where $\delta$ is the cost function error, j is the particular wellbore depth, p and q are indices, $k_j^{core}$ is the core permeability measurement at j depth, and $k_j^{NMR}$ is an NMR log permeability value at j depth.

6. The structured data processing system of claim 1, wherein the subterranean zone comprises an unconventional hydrocarbon reservoir.

7. The structured data processing system of claim 1, wherein the particular threshold comprises a logarithmic comparison of the calculated new permeability values at particular depths between the terranean surface and the true vertical depth that match depths of the core permeability measurements.

8. The structured data processing system of claim 7, wherein the logarithmic comparison comprises an N-fold logarithmic comparison.

9. The structured data processing system of claim 8, wherein N comprises an integer between 2 and 10.

10. The structured data processing system of claim 8, wherein the selected NMR permeability transform comprises inputs including porosity and relaxation time.

11. A computer-implemented method for determining geologic formation permeability performed on a hardware processing device that comprises a memory and one or more hardware processors, the method comprising identifying, with the one or more hardware processors, a data structure stored in the memory, the data structure storing data that comprises nuclear magnetic resonance (NMR) log permeability data from a wellbore that extends from a terranean surface through one or more geologic formations to a subterranean zone and core permeability measurements taken from the one or more geologic formations;

determining, with the one or more hardware processors, particular permeability values from the NMR log permeability data and particular permeability values of the core permeability measurements based on matched depths of the permeability values from the NMR log permeability data and the permeability values of the core permeability measurements;

determining, with the one or more hardware processors, a selected NMR permeability transform that comprises inputs including the determined particular permeability values;

minimizing, with the one or more hardware processors, a cost function to optimize the selected NMR permeability transform, where the cost function relates a particular wellbore depth, a core permeability measurement at the particular wellbore depth, and one or more of the particular permeability values from the NMR log permeability data;

calculating, with the one or more hardware processors, new permeability values for the wellbore between the terranean surface and a true vertical depth of the wellbore with the optimized NMR permeability transform;

comparing, with the one or more hardware processors, the calculated new permeability values at particular depths between the terranean surface and the true vertical depth that match depths of the core permeability measurements;

based on the comparison meeting a particular threshold, generating, with the one or more hardware processors, a user interface that renders one or more graphical representations of the optimized NMR permeability transform and the calculated new permeability values; and transmitting, with the one or more hardware processors, over one or more communication protocols and to a remote computing device, data that represents the one or more graphical representations.

12. The computer-implemented method of claim 11, further comprising determining that the comparison does not meet the particular threshold.

13. The computer-implemented method of claim 12, wherein the selected NMR permeability transform comprises a first selected NMR permeability transform, the method further comprising, based on the determination:

determining, with the one or more hardware processors, a second selected NMR permeability transform that comprises inputs including the determined particular permeability values;

minimizing, with the one or more hardware processors, the cost function to optimize the second selected NMR permeability transform;

calculating, with the one or more hardware processors, new permeability values for the wellbore between the terranean surface and the true vertical depth of the wellbore with the optimized NMR permeability transform;

comparing, with the one or more hardware processors, the calculated new permeability values at particular depths between the terranean surface and the true vertical depth that match depths of the core permeability measurements; and based on the comparison meeting the particular threshold, generating, with the one or more hardware processors, a user interface that renders one or more graphical representations of the optimized NMR permeability transform and the calculated new permeability values.

14. The computer-implemented method of claim 12, further comprising, based on the determination:

inputting, with the one or more hardware processors, the determined new permeability values into the selected NMR permeability transform;

minimizing, with the one or more hardware processors, the cost function to optimize the selected NMR permeability transform;

calculating, with the one or more hardware processors, new permeability values for the wellbore between the terranean surface and the true vertical depth of the wellbore with the optimized NMR permeability transform;

comparing, with the one or more hardware processors, the calculated new permeability values at particular depths between the terranean surface and the true vertical depth that match depths of the core permeability measurements; and based on the comparison meeting a particular threshold, generating, with the one or more hardware processors, a user interface that renders one or more graphical representations of the optimized NMR permeability transform and the calculated new permeability values.

15. The computer-implemented method of claim 11, wherein the cost function comprises:

$$\delta = \sum_j \frac{1}{(k_j^{core})^p} |k_j^{core} - k_j^{NMR}|^q,$$

where $\delta$ is the cost function error, j is the particular wellbore depth, p and q are indices, $k_j^{core}$ is the core permeability measurement at j depth, and $k_j^{NMR}$ is an NMR log permeability value at j depth.

16. The computer-implemented method of claim 11, wherein the subterranean zone comprises an unconventional hydrocarbon reservoir.

17. The computer-implemented method of claim 11, wherein the particular threshold comprises a logarithmic comparison of the calculated new permeability values at particular depths between the terranean surface and the true vertical depth that match depths of the core permeability measurements.

18. The computer-implemented method of claim 17, wherein the logarithmic comparison comprises an N-fold logarithmic comparison.

19. The computer-implemented method of claim 18, wherein N comprises an integer between 2 and 10.

20. The computer-implemented method of claim 18, wherein the selected NMR permeability transform comprises inputs including porosity and relaxation time.

21. A structured data processing system for determining geologic formation permeability, the system comprising:
one or more hardware processors; and a memory in communication with the one or more hardware processors, the memory storing a data structure and an execution environment, the data structure storing data that comprises nuclear magnetic resonance (NMR) log permeability data from a wellbore that extends from a terranean surface through one or more geologic formations to a subterranean zone and core permeability measurements taken from the one or more geologic formations, the execution environment comprising:

an NMR permeability optimization solver configured to perform operations comprising:

determining particular permeability values from the NMR log permeability data and particular permeability values of the core permeability measurements based on matched depths of the permeability values from the NMR log permeability data and the permeability values of the core permeability measurements;

determining a first selected NMR permeability transform that comprises inputs including the determined particular permeability values;

minimizing a cost function to optimize the selected NMR permeability transform;

calculating new permeability values for the wellbore between the terranean surface and a true vertical depth of the wellbore with the optimized NMR permeability transform;

comparing the calculated new permeability values at particular depths between the terranean surface and the true vertical depth that match depths of the core permeability measurements; and based on the comparison meeting a particular threshold, generating a user interface that renders one or more graphical representations of the optimized NMR permeability transform and the calculated new permeability values;

determining that the comparison does not meet the particular threshold;

determining a second selected NMR permeability transform that comprises inputs including the determined particular permeability values;

minimizing the cost function to optimize the second selected NMR permeability transform;

calculating new permeability values for the wellbore between the terranean surface and the true vertical depth of the wellbore with the optimized NMR permeability transform;

comparing the calculated new permeability values at particular depths between the terranean surface and the true vertical depth that match depths of the core permeability measurements; and based on the comparison meeting the particular threshold, generating a user interface that renders one or more graphical representations of the optimized NMR permeability transform and the calculated new permeability values; and a transmission module that transmits, over one or more communication protocols and to a computing device, data that represents the one or more graphical representations.

* * * * *